(12) United States Patent
Whitehead et al.

(10) Patent No.: US 7,942,472 B2
(45) Date of Patent: May 17, 2011

(54) CLAMPING SIDE POST FOR CURTAIN SIDE TRAILER

(75) Inventors: Jerald M. Whitehead, Boise, ID (US); Todd Swanstrom, Boise, ID (US)

(73) Assignee: Western Trailer Co., Boise, ID (US)

(*) Notice: Subject to any disclaimer, the term of this patent is extended or adjusted under 35 U.S.C. 154(b) by 142 days.

(21) Appl. No.: 12/409,342

(22) Filed: Mar. 23, 2009

(65) Prior Publication Data

US 2010/0237647 A1 Sep. 23, 2010

(51) Int. Cl.
*B60J 5/00* (2006.01)
(52) U.S. Cl. .................................. 296/186.1; 296/186.2
(58) Field of Classification Search .............. 296/186.1, 296/184.1, 3, 191; 220/1.5; 224/402; 256/65.03, 256/69, 65.05
See application file for complete search history.

(56) References Cited

U.S. PATENT DOCUMENTS

| | | | | |
|---|---|---|---|---|
| 3,481,645 | A | * | 12/1969 | Stepp ............................ 296/105 |
| 3,709,552 | A | * | 1/1973 | Broadbent ................. 296/186.2 |
| 3,785,694 | A | * | 1/1974 | Sargent ............................ 296/98 |
| 4,545,611 | A | * | 10/1985 | Broadbent ................. 296/186.2 |
| 4,595,231 | A | | 6/1986 | Bennett |
| 4,700,985 | A | * | 10/1987 | Whitehead ................. 296/186.2 |
| 4,795,049 | A | | 1/1989 | Alcorn |
| 4,810,027 | A | | 3/1989 | Ehrlich |
| 4,828,316 | A | * | 5/1989 | Bennett et al. ............. 296/186.2 |
| 4,844,524 | A | * | 7/1989 | Pastva ........................ 296/186.2 |
| 5,007,672 | A | | 4/1991 | Koch |
| 5,058,756 | A | | 10/1991 | Green |
| 5,111,867 | A | * | 5/1992 | Horton et al. ................. 160/330 |
| 6,607,237 | B1 | | 8/2003 | Graaff |
| 6,652,018 | B2 | | 11/2003 | Buchholz |
| 6,923,493 | B2 | | 8/2005 | Buchholz |
| 7,011,358 | B2 | | 3/2006 | Graaff |
| 7,041,253 | B1 | | 5/2006 | Sun |
| 7,055,892 | B2 | | 6/2006 | Buchholz |
| 7,258,391 | B2 | | 8/2007 | Graaff |
| 7,287,808 | B2 | * | 10/2007 | Zugaza Fernandez ..... 296/186.4 |
| 7,306,415 | B2 | | 12/2007 | Halliar |
| 7,377,011 | B2 | * | 5/2008 | Sakakura ................... 16/87.6 R |
| 7,422,270 | B2 | | 9/2008 | Graaff |
| 7,445,265 | B1 | * | 11/2008 | Neumann et al. ........ 296/100.16 |
| 7,798,559 | B2 | * | 9/2010 | Bowling ..................... 296/24.31 |
| 2005/0231004 | A1 | * | 10/2005 | Remmel et al. ............ 296/186.2 |

* cited by examiner

*Primary Examiner* — Kiran B. Patel
(74) *Attorney, Agent, or Firm* — Christensen O'Connor Johnson Kindness PLLC

(57) ABSTRACT

A post assembly is suitable for use with a curtain side trailer having a side rail and a top rail disposed above the side rail. The post assembly has a post and a clamping assembly for selectively coupling the lower end of the post to the side rail. The clamp assembly includes first and second clamp fittings. The first clamp fitting is coupled to the post to engage a lower surface of the side rail. The second clamp fitting slidably coupled to the post and to engage an upper surface of the side rail. A linkage is coupled to the post and to the second clamp fitting. Movement of the linkage reciprocates the second clamp fitting between a clamped position and an unclamped position. In the clamped position, the second clamp fitting and the first clamp fitting cooperate to apply a clamping force to the side rail.

7 Claims, 9 Drawing Sheets

CLAMPING SIDE POST FOR CURTAIN SIDE TRAILER

BACKGROUND

When transporting non-bulk type goods on a trailer, it is often advantageous and desirable to use a curtain side trailer that allow the goods to be loaded and unload from the side of the trailer. Providing access to the goods from the side of the trailer allows the goods to be loaded and unloaded in any order. The improved access to the interior of the trailer also allow for more extensive use of forklifts or other lifting devices during the loading and unloading procedure. To protect cargo from water and dirt, a curtain side trailer often includes a roof and one or more walls, such as a front wall and a side wall. For the open sides, i.e., the sides that do not have permanent walls, curtains provide moveable cover to protect the cargo.

Side posts are commonly employed in curtain side trailers to provide additional support to the roof. When the trailer is in transit, one or more side posts are removably secured to the trailer to extend from the bed of the trailer to the roof. During loading and unloading, the side posts are removed to provide improved access to the bed of the trailer. Although known side posts provide additional support to the roof, they are generally not secured to the deck of the trailer. Accordingly, they provide no cargo containment capability.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An exemplary embodiment of post assembly for use with a curtain side trailer is disclosed. The trailer has a bed and a side rail associated with the bed. The trailer also has a top rail disposed above the side rail. The post assembly has a post and a clamping assembly for selectively coupling the lower end of the post to the side rail. The clamp assembly includes first and second clamp fittings. The first clamp fitting is coupled to the post and is sized and configured to engage a lower surface of the side rail. The second clamp fitting is slidably coupled to the post and is sized and configured to engage an upper surface of the side rail. A linkage is coupled at one end to the post and at a second end to the second clamp fitting. Movement of the linkage reciprocates the second clamp fitting between a clamped position and an unclamped position. When the second clamp fitting is in the clamped position, the second clamp fitting and the first clamp fitting cooperate to apply a clamping force to the side rail.

Also disclosed is an exemplary embodiment of a post assembly for use with a curtain side trailer. The trailer has a bed with a side rail and an upper portion with a top rail. The post assembly includes a post, an upper attachment assembly for coupling the upper end of the post to the top rail, and a clamping assembly for selectively coupling the lower end of the post to the side rail. The clamp assembly includes first and second clamp fittings. The first clamp fitting is coupled to the post and is sized and configured to engage a lower surface of the side rail. The second clamp fitting is slidably coupled to the post and is sized and configured to engage an upper surface of the side rail. A linkage has a first end coupled to the post and a second end coupled to the second clamp fitting. Movement of the linkage reciprocates the second clamp fitting between a clamped position and an unclamped position. When the second clamp fitting is in the clamped position, the first and second clamp fittings apply a clamping force to the side rail.

A disclosed embodiment of a curtain side trailer includes a side rail and a top rail extending along the length of the trailer, wherein the top rail is positioned above the side rail. The trailer further includes a post with a lower end selectively coupleable to the side rail and an upper end coupled to the top rail. A first clamp fitting is coupled to the post and is sized and configured to engage the side rail. A second clamp fitting is movably coupled to the post for reciprocating movement between a clamped position and an unclamped position. The second clamp fitting engages the side rail in the clamped position. The first and second clamp fittings impart a clamping force on the side rail when the second clamp fitting is in the clamped position.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Embodiments of the disclosed subject matter will now be described with reference to the drawings where like numerals correspond to like elements. The described embodiments are directed to clamping side posts suitable for use on curtain side trailers. Although the embodiments are described with reference to curtain side trailers, it will be appreciated that the disclosed embodiments are suitable for use in other types trailers, including open sided trailers without curtains and the like. Accordingly, the following descriptions and illustrations should be considered illustrative in nature, and not limiting the scope of the disclosed subject matter as claimed.

Figure 1:
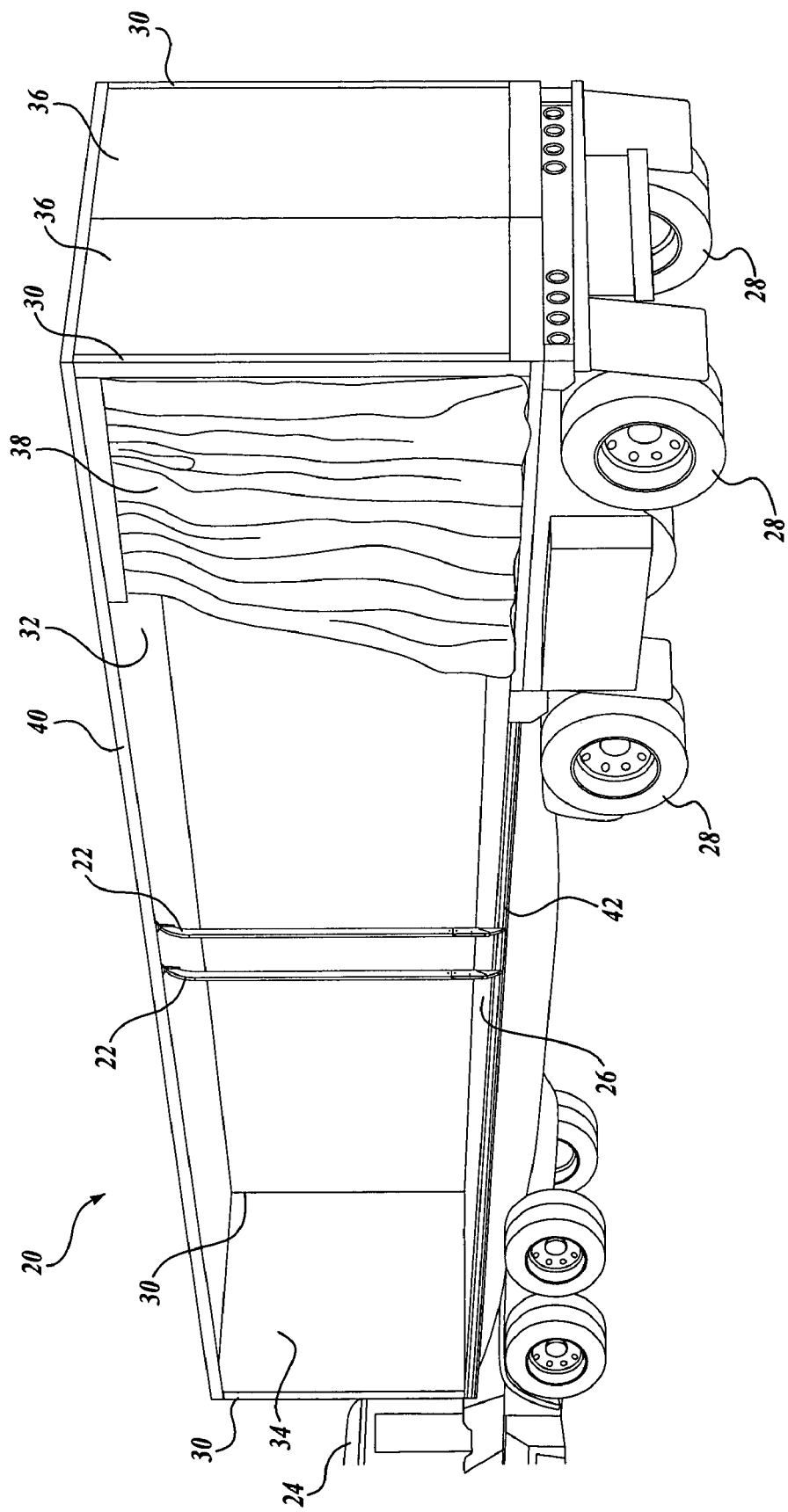
FIG. 1 shows an isometric view of a curtain side trailer with a pair of exemplary side post assemblies.

Turning now to FIG. 1, a curtain side trailer 20 having side post assemblies 22 in accordance with one exemplary embodiment of the disclosed subject matter is shown. The trailer 20 is functionally connectable to a heavy duty vehicle 24 and includes a bed 26 supported by wheels 28 connected thereto via a known suspension (not shown). The bed 26 is suitable for supporting cargo and optionally has provisions to allow for the cargo to be secured to the bed.

A corner post 30 extends upwardly from the each of the corners of the bed 26 to support a roof 32 that covers the bed. In the illustrated trailer, a front wall 34 is positioned between the front corner posts 30 to protect the cargo from the elements, and optionally, to provide additional support to the roof 32. A pair of doors 36 are mounted to the rear corner posts 30 to protect the cargo and to provide access to the interior of the trailer 20.

A side curtain 38 is attached to one side of the trailer 20 and is selectively moveable between a closed position and an open position. The curtain is slidably coupled at the upper edge to a top rail 40 that extends along the edge of the roof 32 for the length of the trailer. The bottom edge of the curtain is selectively detachable to a side rail 42 that extends along the edge of the trailer bed 26. In the closed position, the curtain 38 spans the area between the top rail 40 to the side rail 42 along the length of the trailer to provide a barrier between the cargo and the outside of the trailer. Detaching the curtain 38 from the side rail 42 allows the curtain to be moved along the top rail 40 to an open position.

One or more side post assemblies 22 are connected to the top rail 40 and the side rail 42 of the trailer 20 to provide additional support to the roof 32. In addition, because the side post assemblies 22 are coupled to the top rail 40 and side rail 42, the side post assemblies are capable of resisting lateral loads and, therefore, provide cargo containment capability. At the same time, unlike fixed side post configurations, the illustrated side post assemblies 22 can be moved along the top rail 40 to improve access to the interior of the trailer.

Figure 2:
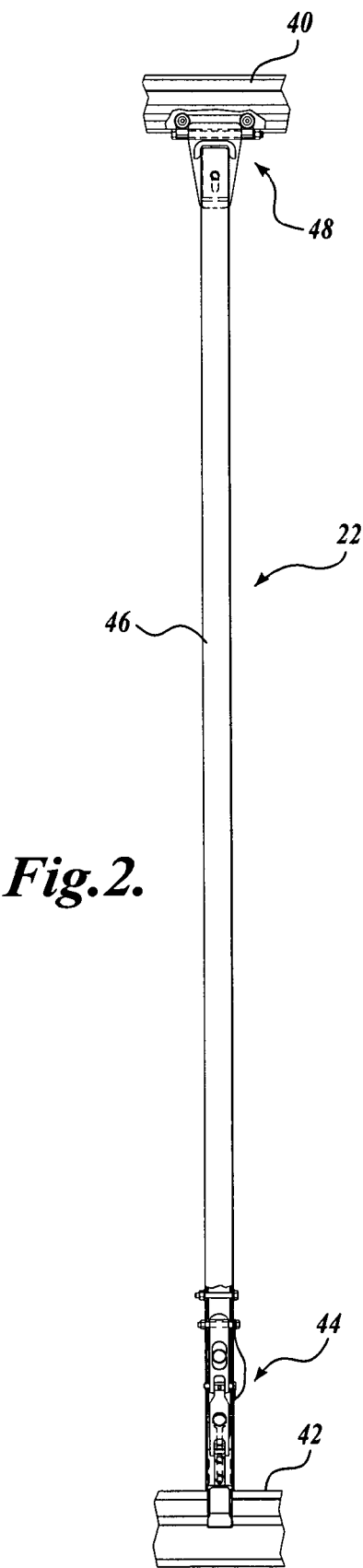
FIG. 2 shows a side view of one of the side post assemblies shown in FIG. 1 with the side post assembly in a clamped position.
Figure 3:
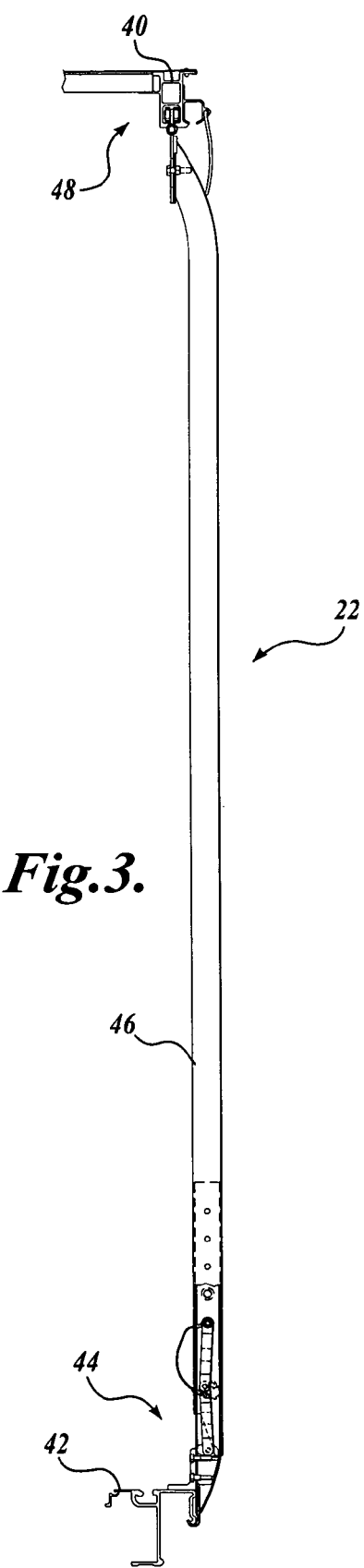
FIG. 3 shows a front view of the side post assembly shown in FIG. 2.

FIGS. 2 and 3 show a side view and a front view, respectively, of one illustrative embodiment of a side post assembly 22 in accordance with the present disclosure. A clamping assembly 44 is located on the lower end of a post 46 to detachably couple the lower end of the post to the side rail 42. An upper attachment assembly 48 couples the upper end of the post to the top rail 40.

Figure 4:
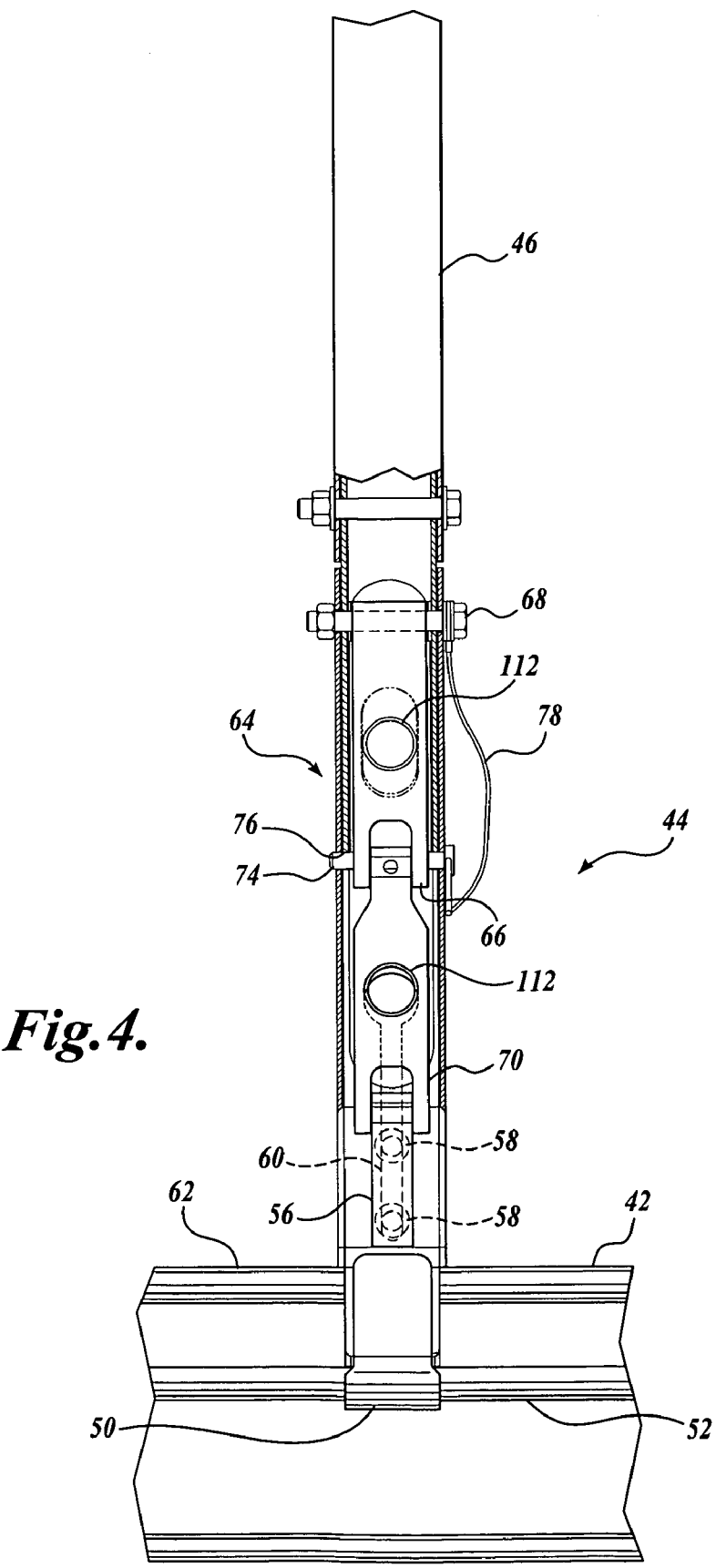
FIG. 4 shows a side view of a clamping assembly of the side post assembly shown in FIG. 2.
Figure 5:
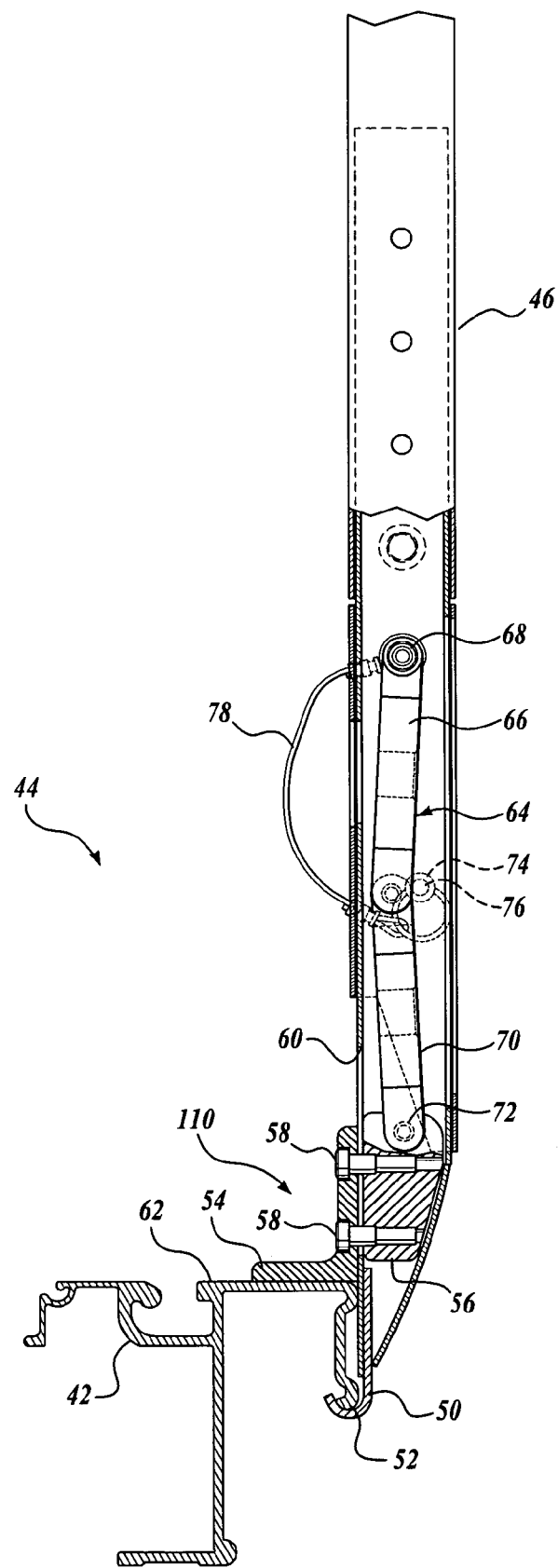
FIG. 5 shows a front view of the clamping assembly shown in FIG. 4.

Referring to FIGS. 4 and 5, the clamping assembly 44 of the illustrated embodiment will now be described. The clamping assembly 44 has a lower clamp fitting 50 fixedly disposed on the bottom end of the post 46. The lower clamp fitting 50 is sized and configured to engage a portion of the side rail 42. In the illustrated embodiment, the lower clamp fitting 50 has a hook shape that corresponds to a lower surface 52 of the side rail 42. When the clamping assembly 44 is in the clamped position, the lower clamp fitting 50 engages the lower surface 52 of the side rail 42 to restrain the lower clamp fitting and, thus, the post 46 against movement in an upward direction.

Figure 9:
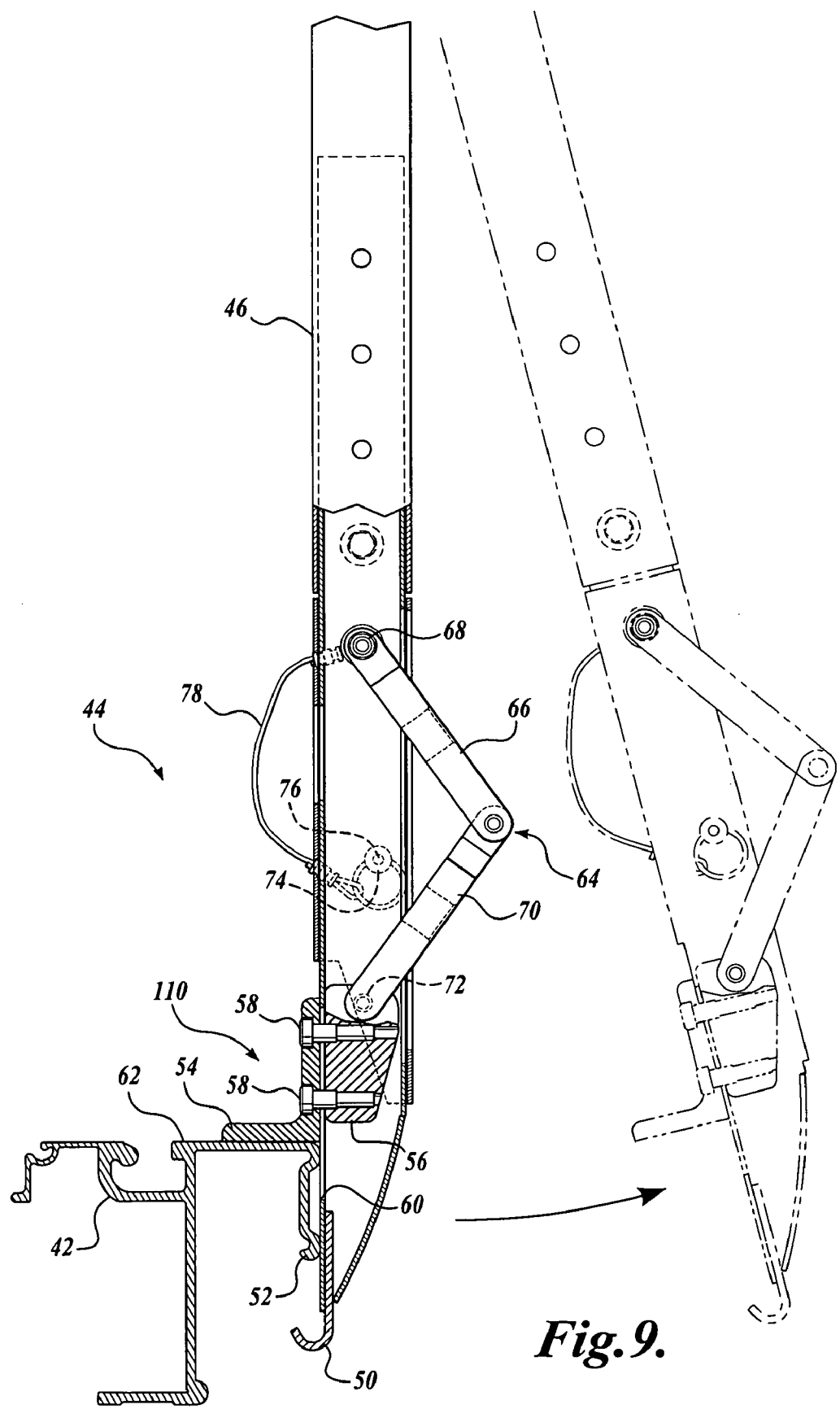
FIG. 9 shows a front view of the clamping assembly of the side post assembly shown in FIG. 8.

An upper clamp fitting 110 is slidably coupled to the post for reciprocating movement between a clamped position (FIGS. 4 and 5) and an unclamped position (FIG. 9). In the illustrated embodiment, the upper clamp fitting 110 includes an L-shaped clamping fixture 54 coupled to a block 56 by a pair of fasteners 58, such as bolts or pins. The block 56 is disposed within a central portion of the post 46, and the clamping fixture 54 is positioned along the inboard side of the post. The fasteners 58 extend through a slot 60 formed in the wall of the post 46 to guide the upper clamp fitting 110 along a path between the clamped and unclamped positions. When the upper clamp fitting 110 is in the clamped position, the clamping fixture 54 engages an upper surface 62 of the side rail 42.

A linkage 64 restrains the upper clamp fitting 110 in the clamped position. The linkage 64 includes a first link 66 rotatably coupled at a first end to the post 46 with a first pin 68 and rotatably coupled at a second end to a first end of a second link 70. The other end of the second link 70 is rotatably coupled to the block 56 with a second pin 72. Thus, the first and second links 66 and 70 define a two bar linkage 64, wherein rotation of the linkage back and forth between an extended position (FIGS. 4 and 5) and a retracted position FIG. 9) reciprocates the upper clamp fitting 110 between the clamped position and the unclamped position.

When the clamping assembly 44 is in the clamped position, the upper clamp fitting 110 and the lower clamp fitting 50 cooperate to apply a clamping force to the side rail 38, thereby releasably coupling the lower end of the post 46 to the side rail. More specifically, the upper clamp fitting 110 engages an upper surface 62 of the side rail 42 to apply a downward force to the side rail, and the lower clamp fitting 50 engages a lower surface 52 of the side rail to apply an upward force onto the side rail. The resulting clamping force restrains the side rail 42 between the upper and lower clamp fittings 50 and 110.

The clamping assembly 44 is maintained in the clamped position by the linkage 64, which is a known over-center linkage. That is, the linkage 64 resists movement through a "center" position, i.e., a position when the linkage forms a straight line between the first and second pins 68 and 72. As shown in FIG. 5, when the clamping assembly 44 is in a clamped position, movement of the upper clamp fitting 110 to the unclamped position requires that the linkage 64 move through the center position. Thus, the linkage 64 applies a force that resists movement of the upper clamp fitting 110 toward the unclamped position.

Still referring to FIGS. 4 and 5, the clamping assembly 44 includes a retaining pin 74 to help ensure that the clamping assembly does not inadvertently become unclamped. The retaining pin 74 is selectively insertable into a hole 76 formed in the post 46 so that the retaining pin spans the width of the post. Referring specifically to FIG. 5, when the retaining pin 74 is disposed within the hole 76, and the clamping assembly 44 is in the clamped position, the pin prevents movement of the linkage. More specifically, the pin 74 provides a physical barrier that prevents the linkage 64 from moving to unclamp the clamping assembly 44. The pin 74 is optionally tethered to the post 46 by a cable 78 attached at one end to the pin and at the other end to the post.

Figure 6:
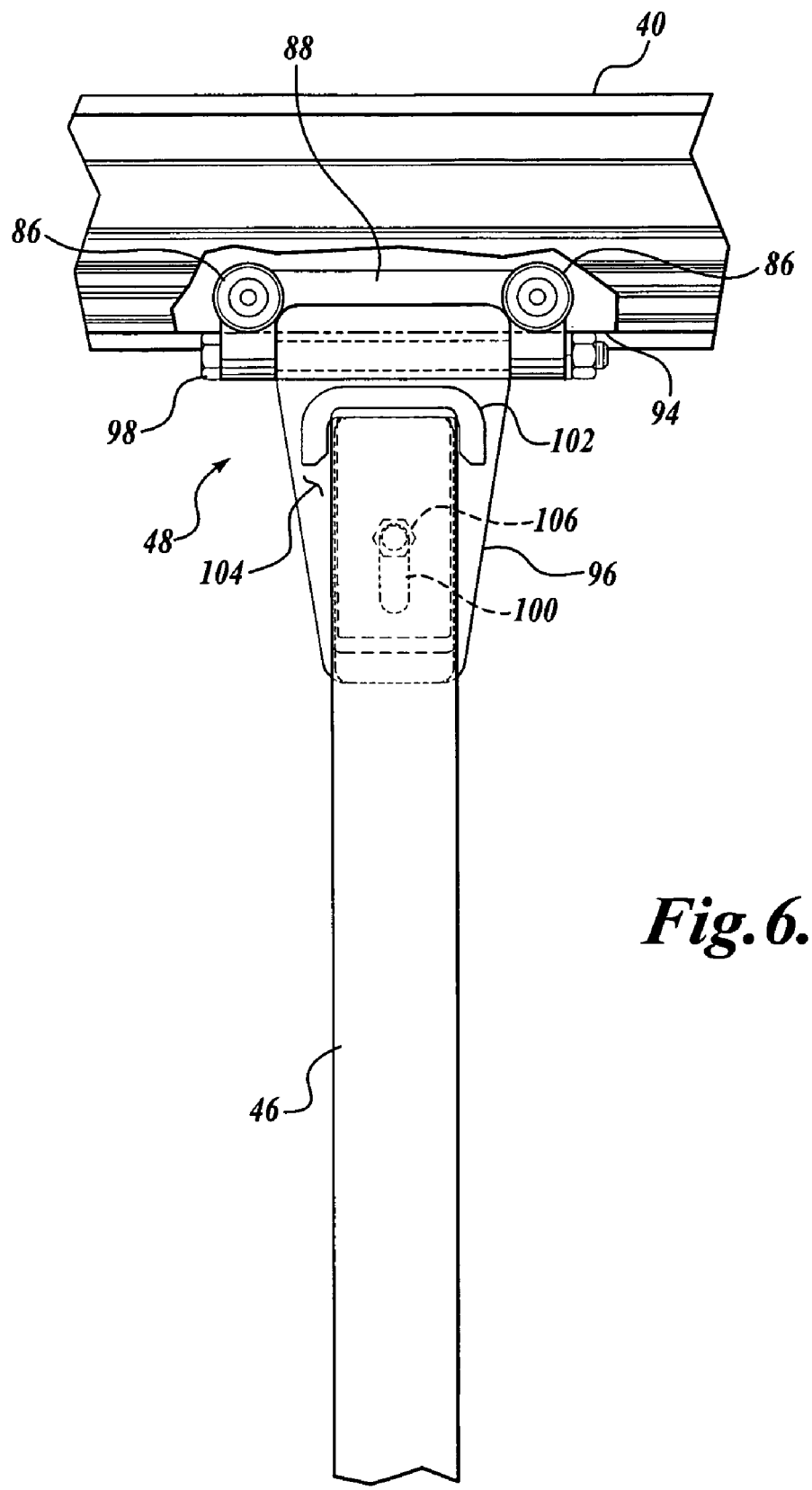
FIG. 6 shows a side view of an upper attachment assembly of the side post assembly shown in FIG. 2.
Figure 7:
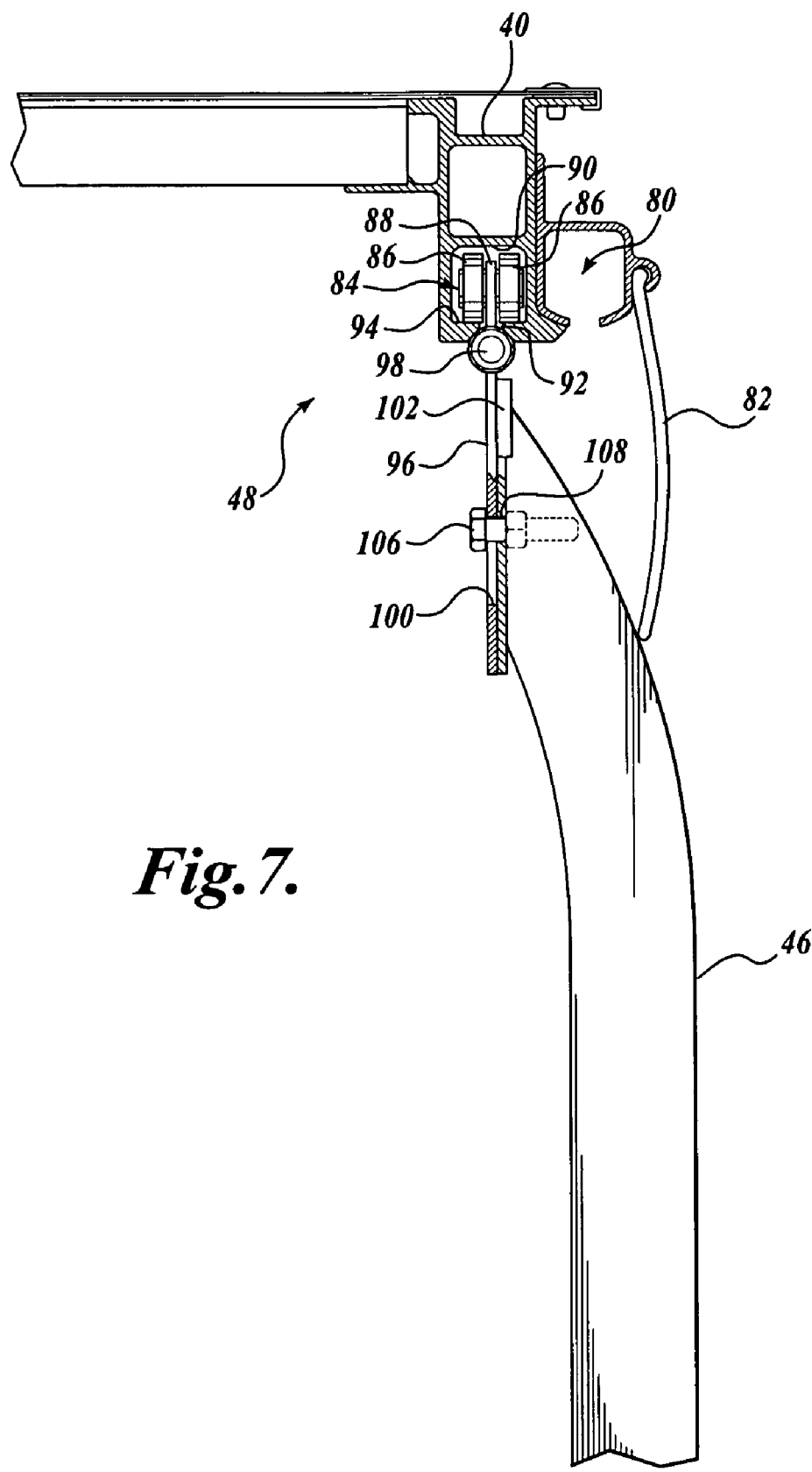
FIG. 7 shows a front view of the upper attachment assembly shown in FIG. 6.

FIGS. 6 and 7 show the attachment of the upper end of the side post assembly 22 to the top rail 40 of the trailer 20. The top rail 40 is typically an extruded metal beam that spans the length of the trailer 20 along an edge of the roof 32. In the illustrated embodiment, the top rail 40 includes a curtain support channel 80 for slidingly supporting one or more curtains (not shown) to selectively cover the otherwise open side of the trailer 20 and the cargo contained therein. A flexible skirt 82 is attached to the top rail 40 and extends downwardly from the top rail to the curtain to prevent water and dirt from entering the trailer 20 through the gap between the top rail 40 and the curtain.

An upper attachment assembly 48 couples the post 46 to the top rail 40. The upper attachment 48 assembly includes a roller assembly 84 that slidingly engages the top rail 40. The roller assembly 84 includes a plurality of rollers 86 rotatably coupled to a frame 88. When mounted to the top rail 40, a portion of the frame 88 and the rollers 86 mounted thereto are disposed within a post support channel 90 formed in the top rail The post support channel 90 is located inboard of the curtain support channel 80 and has a generally square cross section. A slot 92 is formed in the bottom of the post support channel 90 along the length of the top rail 40. When the roller assembly 84 is mounted to the top rail 40, the rollers 86 and a portion of the frame 88 are disposed within the post support channel 90 so that the rollers rollingly engage a lower surface 94 of the post support channel. Thus, the roller assembly 84 is free to move back and forth along the top rail 40.

A portion of the frame 88 extends through the slot 92 formed in the post support channel 90 and is hingedly coupled to a mounting plate 96. The mounting plate 96 is hingedly coupled to the frame 88 with a pin 98 or a bolt. The hinge line is substantially horizontal and extends in the forward and rear direction so that the mounting plate 96 is rotatable about the pin 98 in an inboard and outboard direction. The mounting plate 96 also includes a substantially vertical slot 100 formed therein. A "U"-shaped post locating fitting 102 is positioned on the outboard surface 104 of the mounting plate 96 above the slot 100 and with the open end facing down.

A fastener 106, such as a bolt or a pin, slidingly couples the post 46 to the mounting plate 96. More specifically, the fastener 106 extends though a hole 108 formed in the post 46 and the slot 100 in the mounting plate 96. Thus, the fastener 106 couples the post 46 to the mounting plate 96, but allows the post to move vertically relative to the mounting plate as the fastener translates from one end of the slot to the other. When the post 46 is in a clamped position, the fastener 106 is positioned in an upper portion of the slot 100, and the upper end of the post is engaged with the post locating fitting 102. Engagement of the post 46 with the post locating fitting 102 resists rotation of the side post about the fastener 106, thus maintaining the post in a substantially vertical orientation. When the post 46 is in an unclamped position, and the clamping assembly 44 is disengaged from the side rail 42, the fastener 106 is positioned in a lower portion of the slot 100. In this position, the upper end of the post 46 is disengaged with the side rail 42, and the post is free to rotate about the fastener 106.

The described embodiments of a clamping side post assembly 22 provide vertical support to the roof 32 of the trailer 20 while also providing cargo containment capability. When the side post assembly 22 is in the clamped position, the clamping assembly 44 couples the lower end of the post 46 to the side rail 42. More specifically, the upper and lower clamp fittings 110 and 50 cooperate to resist movement of the post 46 in both the vertical and lateral directions. Moreover, the clamping force provided by the clamping assembly 44 creates a frictional resistance between the clamping assembly 44 and the side rail 42 that resists movement of the clamping assembly along the length of the side rail. The clamping force is maintained by the over-center linkage 64, which forces the upper clamp fitting 110 toward the lower clamp fitting 50. The retainer pin 74 helps ensure that the over-center linkage 64 will not inadvertently rotate, thereby decoupling the clamping assembly 44 from the side rail 42.

The linkage 64 optionally includes apertures 112 formed therein to receive a portion of a tool that provides additional leverage to an operator moving the linkage to or from the clamped position. In the illustrated embodiment, the apertures are sized to receive one end of a winch bar that is typically used to tighten the winch and pawl combination that secures the tie down straps commonly used to secure cargo to the bed of the trailer. The winch bar is a steel bar approximately three feet long and having a tapered end. By inserting the tapered end of the winch bar into one of the apertures and then applying an upward or downward force to the opposite end of the winch bar, the operator gains additional leverage to move the linkage into or out of the clamped position.

Moving the clamping assembly 44 from an unclamped position to the clamped position not only secures the lower end of the post 46 to the side rail 42, it also engages the upper end of the post with the post locating fitting 102 to secure the post assembly 22 in a vertical position. When the upper clamp fitting 110 is engaged with an upper surface 62 of the side rail 42, and the clamping assembly 44 is moved to the clamped position, the upper clamp fitting remains engaged with the top surface of the side rail, while the clamping motion raises lower clamp fitting 50 toward the lower surface 52 of the side rail. Because the post moves with the lower clamp fitting 50, the upper end of the post moves upwardly relative to the mounting plate 96 and engages the post locating fitting 102.

The clamping assembly 44 and the upper attachment assembly 48 enable the side post assembly 22 to provide cargo containment capability. In this regard, the clamping assembly 44 resists lateral movement between the lower end of the side post assembly and the side rail 42, and the upper attachment 48 hingedly couples the upper end of the side post assembly 22 to the top rail 40. As a result, the side post assembly 22 provides a physical barrier capable of containing cargo that might otherwise fall out of the trailer.

Figure 8:
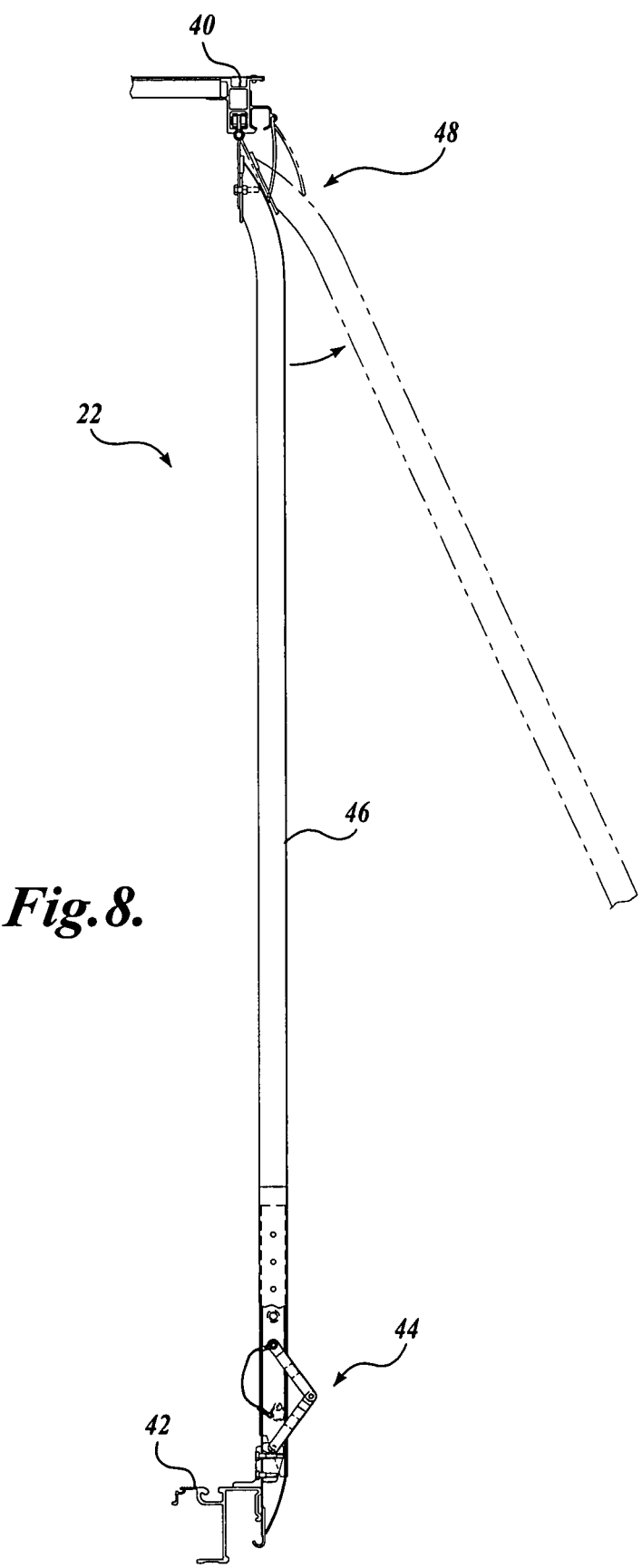
FIG. 8 shows a front view of the side post assembly shown in FIG. 2 with the side post assembly in an unclamped position.
Figure 10:
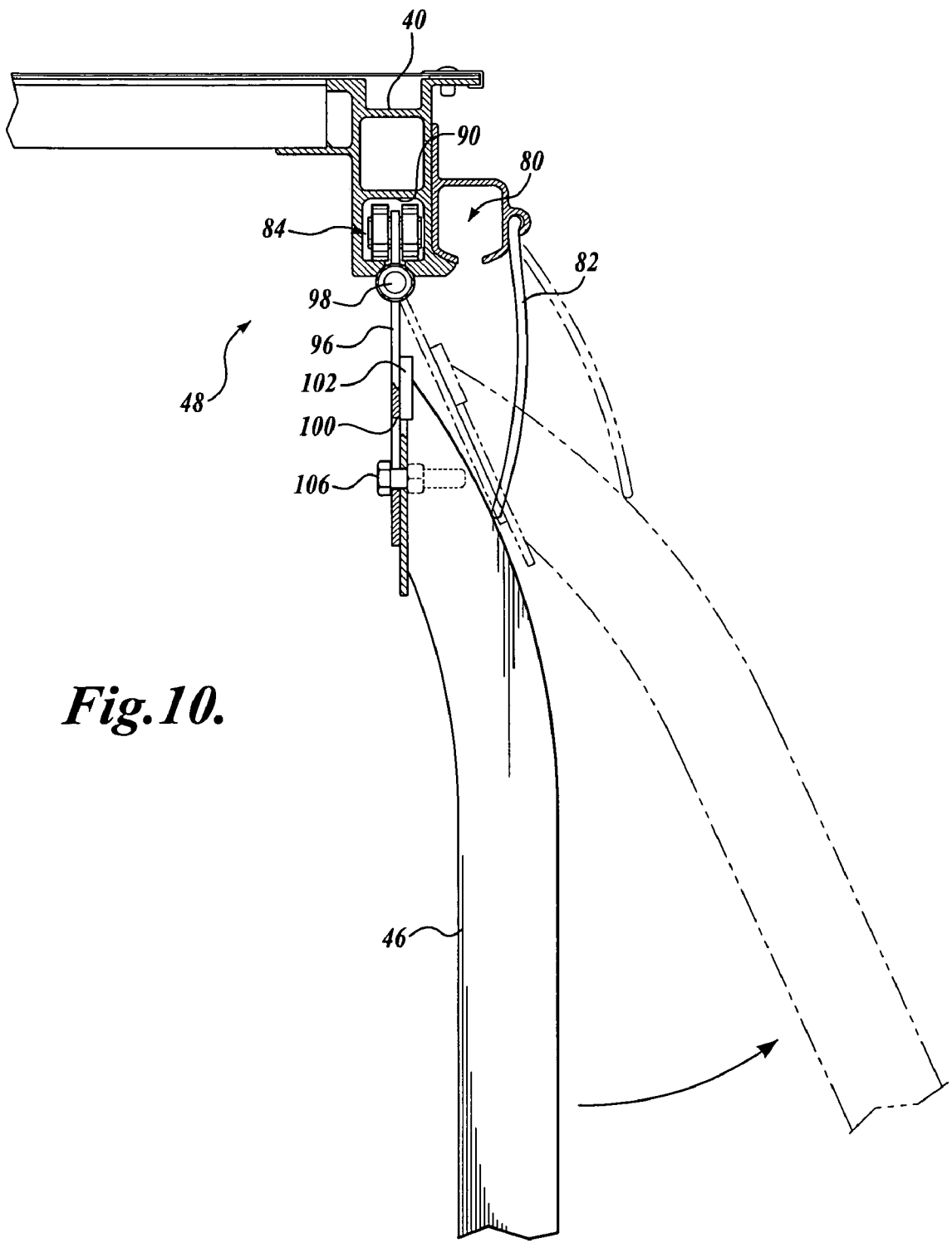
FIG. 10 shows a front view of the upper attachment assembly of the side post shown in FIG. 8.

As shown in FIGS. 8-10, the described embodiments of a clamping side post assembly 22 are also selectively moveable to provide improved access to the interior of the trailer 20 through the side. To move a side post assembly 22, an operator removes the retaining pin 74 from the hole 76 in the post 46 and rotates the linkage 64 from the clamped position to the unclamped position. As the linkage 64 rotates to the unclamped position, the upper clamp fitting 110 moves relative to the post 46, and the distance between the upper clamp fitting and the lower clamp fitting 50 increases. Because the upper clamp fitting 110 remains engaged with the upper surface 62 of the side rail 42, the post 46 and the lower clamp fitting 50 move downward relative to the side rail. As the lower clamp fitting 50 moves downward, it disengages from the lower surface 52 of the side rail 42, unclamping the lower end of the side post assembly 22 from the side rail. At the same time, the upper end of the post 46 slides downward relative to the mounting plate 96, thereby disengaging the upper end of the post from the side post locating fitting 102.

When the side post assembly 22 is in the unclamped position, the lower end of the post 46 is rotatable about the hinged connection between the upper end of the post and the top rail 40. This allow an operator to swing the lower end of the side post assembly 22 away from the side rail. Because the upper end of the post 46 is disengaged from the post locating fitting 102, the post can also rotate about the fastener 106 that connects the post to the mounting plate 96. Further, the roller assembly 84 enables the operator to slide the entire side post assembly 22 forward or rearward along the top rail 40. Providing further access to the interior of the trailer 20 in this manner allows an operator to load or unload cargo in any order and from any direction.

To clamp the side post assembly 22 in position, the operator first slides the upper end of the side post assembly along the top rail 40 until the upper end of the post 46 is in the desired location. The operator then moves the lower end of the post 46 toward the side rail 42 until the lower portion of the upper clamp fitting 110 rest on the upper surface 62 of the side rail. Rotating the linkage 64 through its center position raises the post 46 and, therefore, the lower clamp fitting 50 until the upper and lower clamp fittings are clamped to the side rail 42. In addition, raising the post 46 engages the upper end of the post with the post locating fitting 102, which resists rotation of the post about the fastener 106 that couples the post to the mounting plate 96. The operator then inserts the retaining pin 74 into the hole 76 formed in the post, thereby preventing unintentional unclamping of the clamping assembly 44.

Raising the post 46 during the clamping process provides an advantage over known side post assemblies. When the side post assemblies are not installed, the top rail, which is generally a long, thin member, tends to flex under its own weight. That is, the middle portion of the top rail will deflect downward between the corner supports due to the weight and flexibility of the beam. As a result, the distance between the side rail and the top rail is reduced at a central portion of the top rail, often to the point that a known side post assembly can not be mounted to the trailer without first raising the top rail to provide enough space between the side rail and the top rail so that the side post assembly can be positioned therebetween.

In contrast to currently known side post assemblies, when the presently disclosed side post assembly 22 is unclamped, the post 46 hangs from the top rail 40 by the upper attachment assembly 48. When the side post assembly 22 is positioned in the desired location, the distance between the upper and lower clamp fittings 54 and 50 is such that the clamping assembly 44 can be positioned with the upper clamp fitting above the side rail 42 and the lower clamp fitting below the side rail. Moving the clamping fitting assembly 44 to the clamped position moves the upper clamp fitting 54 downward until it engages a top portion 62 of the side rail 42. With the upper clamp fitting 54 engaging the side rail 42, further movement toward the clamped position raises the side post 46. Initially, the top end of the side post 46 moves upward relative to the mounting plate 96 due to the previously described sliding engagement of the fastener 106 with the slot 100 formed in the mounting plate. When the fastener 106 reaches the top of the slot 100, further movement toward the clamped position continues to raise the post 46, which raises the top rail 40 and, therefore, the roof of the trailer 20 until the lower clamping assembly 44 is in the clamped position.

While illustrative embodiments have been illustrated and described, it will be appreciated that various changes can be made therein without departing from the spirit and scope of the subject matter described herein.

The embodiments of the invention in which an exclusive property or privilege is claimed are defined as follows:

1. A side post assembly configured for use with a curtain side trailer, the curtain side trailer having a side rail associated with a bed of the trailer and a top rail located above the side rail, the side post assembly comprising:

(a) a post;
(b) an upper attachment assembly for coupling an upper end of the post to the top rail; and
(c) a clamping assembly for selectively coupling a lower end of the post to the side rail, the clamp assembly comprising:
  (i) a first clamp fitting coupled to the post, the first clamp fitting being sized and configured to engage a lower surface of the side rail;
  (ii) a second clamp fitting slidably coupled to the post, the second clamp fitting being sized and configured to engage an upper surface of the side rail; and
  (iii) a linkage, a first end of the linkage being coupled to the post, a second end of the linkage being coupled to the second clamp fitting, movement of the linkage reciprocating the second clamp fitting between a clamped position and an unclamped position, wherein the second clamp fitting and the first clamp fitting apply a clamping force to the side rail when the second clamp fitting is in the clamped position.

2. The side post assembly of claim 1, the upper attachment assembly comprising: (a) a roller assembly slidingly coupled to the top rail for translational movement in a forward and rear direction; and (b) a mounting plate coupled to the upper end of the post and to the roller assembly.

3. The side post assembly of claim 2, wherein the mounting plate is rotatably coupled to the roller assembly.

4. The side post assembly of claim 2, wherein the upper end of the post is slidingly coupled to the mounting plate for movement between a raised position and a lowered position.

5. The side post assembly of claim 4, the mounting plate comprising a post locating fitting, the post locating fitting engaging a portion of the post when the post is in the raised position and disengaging the portion of the post when the post is in the lowered position.

6. The side post assembly of claim 5, wherein the post locating fitting resists rotation of the post relative to the top rail when the post is in the raised position.

7. The side post assembly of claim 5, wherein the post locating fitting comprises a C-shaped fitting sized and configured to receive a portion of the post when the post moves from the lowered position to the raised position.

* * * * *